Nov. 7, 1950 F. E. RADMAN 2,528,973
ADJUSTABLE SUPPORT FOR CATHODE-RAY TUBES
Filed Jan. 6, 1949 4 Sheets-Sheet 1
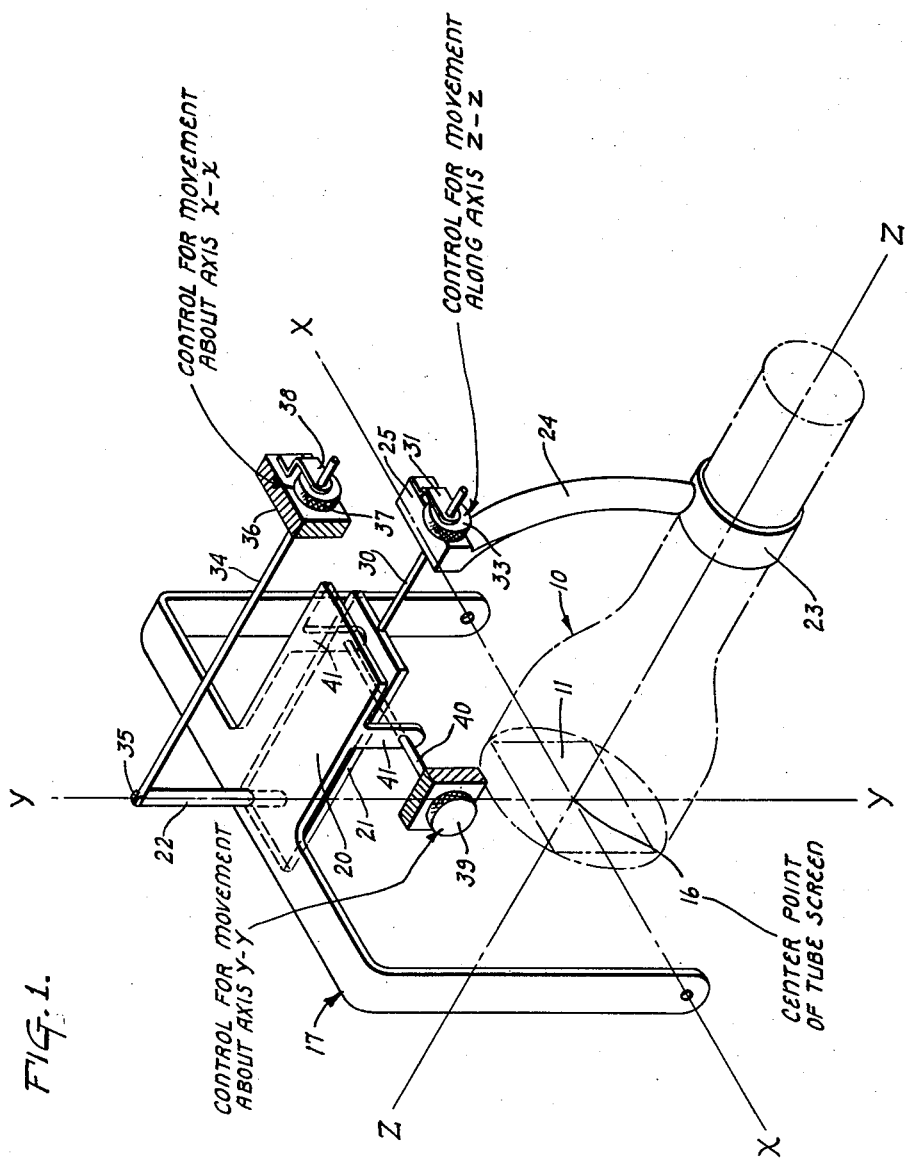
INVENTOR.
FREDERICK E. RADMAN
BY
Brown, Jenk & Lynnestvedt
AGENTS

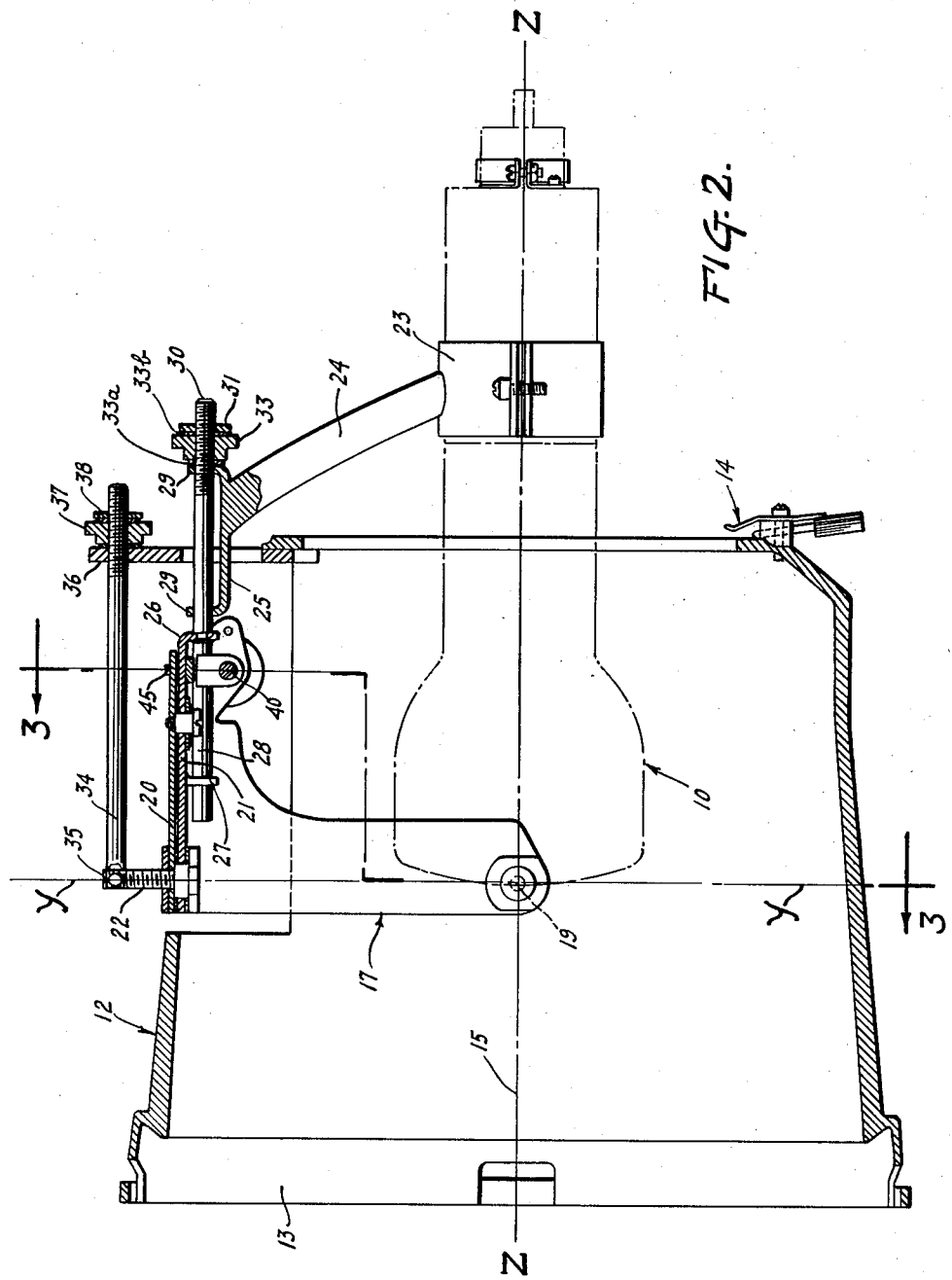

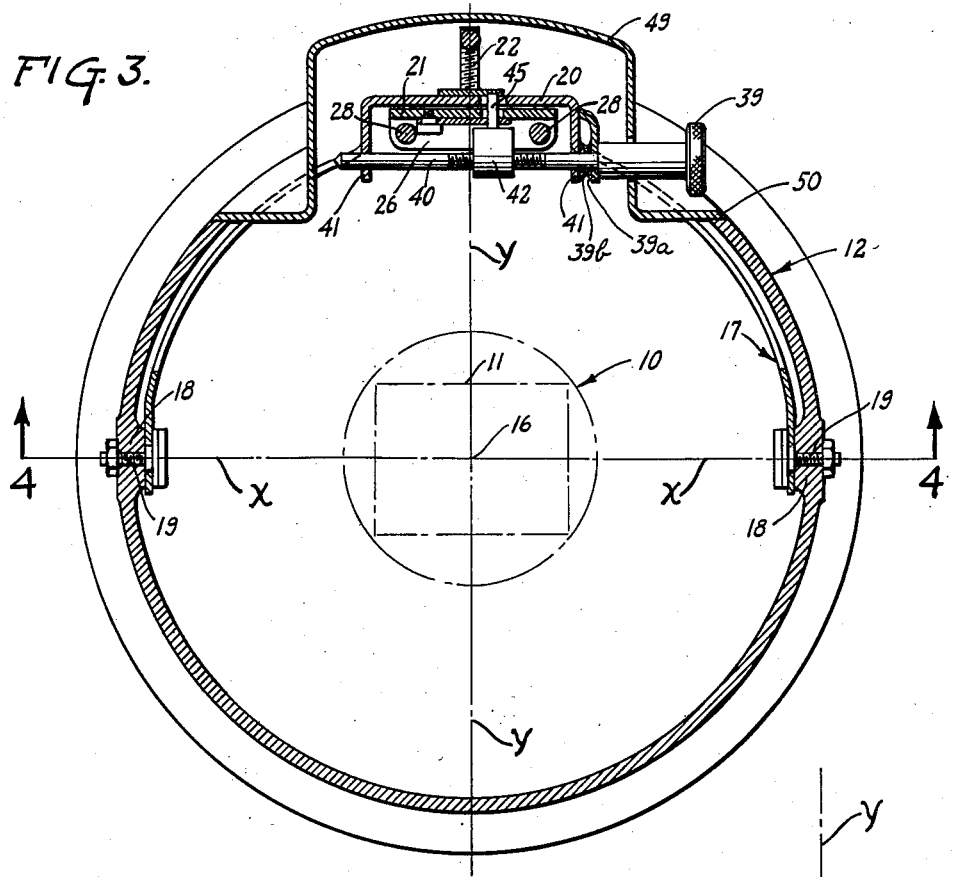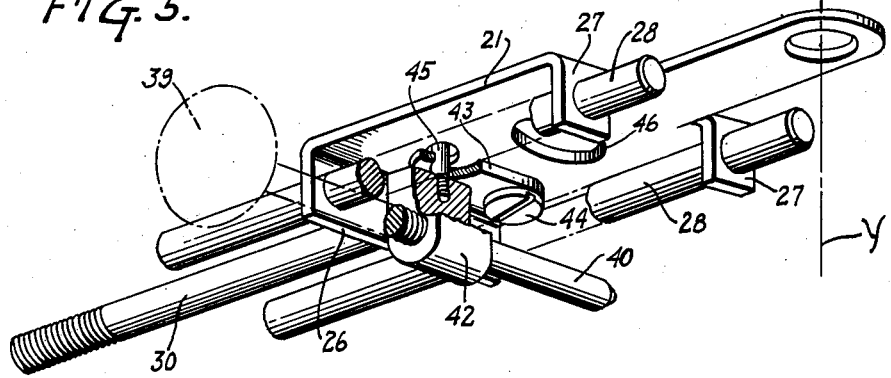

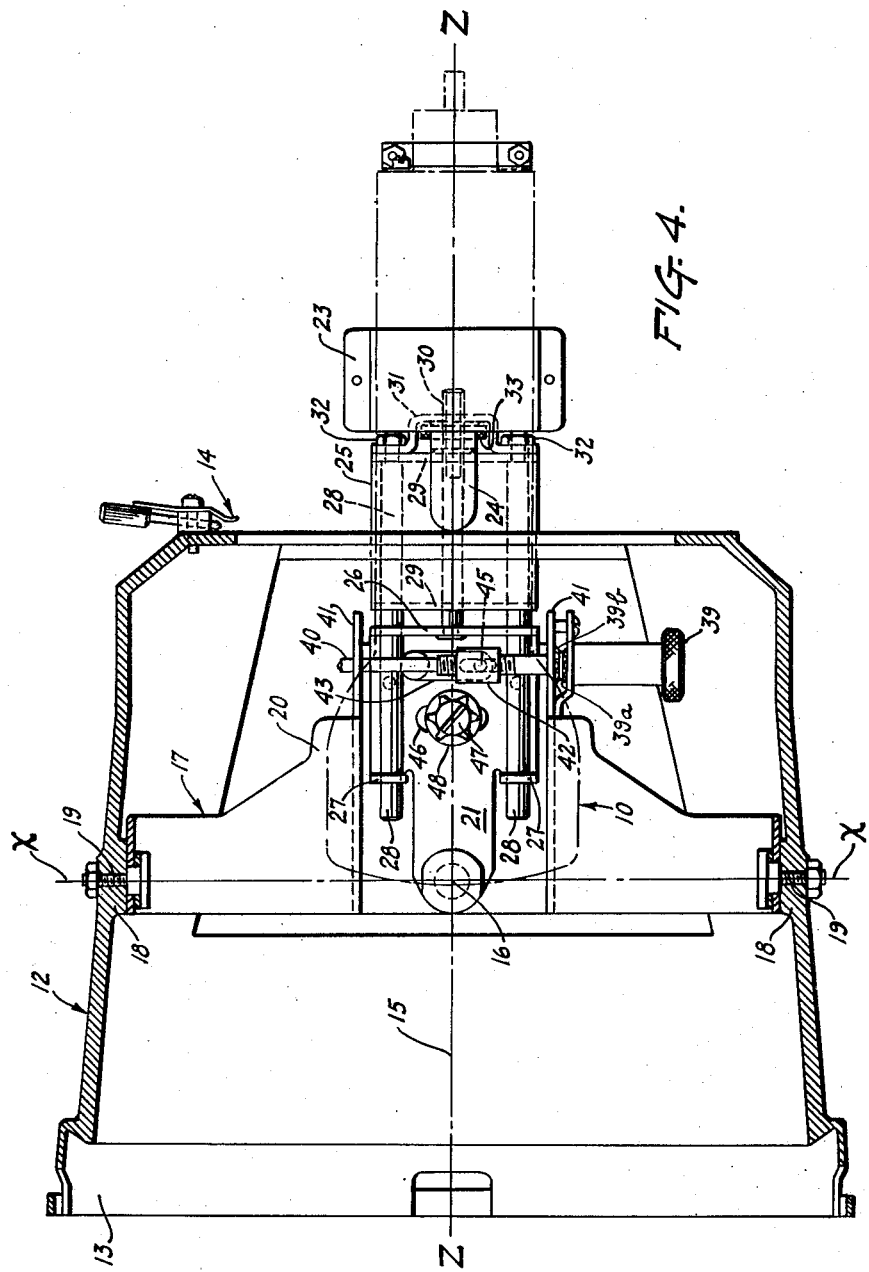

Patented Nov. 7, 1950

2,528,973

UNITED STATES PATENT OFFICE 2,528,973

ADJUSTABLE SUPPORT FOR CATHODE-RAY TUBES

Frederick E. Radman, Roslyn, Pa., assignor to Philco Corporation, Philadelphia, Pa., a corporation of Pennsylvania Application January 6, 1949, Serial No. 69,523

10 Claims. (Cl. 250—141)

The invention hereinafter described and claimed relates to projection type image-forming optical systems and, while of broader applicability, is especially concerned with apparatus adapted adjustably to support cathode-ray tubes used in projection television receivers.

In such receivers, as well as in certain other optical apparatus to which the concepts of the invention are applicable, it is necessary to effect precisely controlled relative movement between the cathode-ray tube (or other device upon which an image is presented) and certain optical elements which define an optical axis. Such movement is required, if proper focus is to be achieved upon a viewing surface or screen. Although not limited to use therewith, the concepts of this invention are of particular utility in projection television receivers utilizing a "Schmidt type" reflective optical system, that is, receivers which include a mirror and a lens, or correcting plate, effective to provide correction for an aberration introduced by said mirror. A cathode-ray tube is arranged between the mirror and lens, which latter two elements define an optical axis.

In the patent to Ingo L. Stephan, bearing No. 2,424,513, granted July 22, 1947, and assigned to the assignee of the instant invention, there is disclosed and claimed an advantageous type of focusing apparatus which, essentially, comprises: mechanism for angularly adjusting a screen about a predetermined point as a center of pivotation whereby properly to orient said screen with respect to an optical axis, said point lying substantially in said screen, the aforesaid mechanism taking the form of means providing a pair of individual rotational axes passing through said point in substantially right-angularly related directions and about which said screen may be adjusted selectively.

My invention has to do with improvements in apparatus of this class.

While the construction with which the above-mentioned patent is concerned has proven highly advantageous in practice, embodiments of that invention are found to be subject to certain operational difficulties and disadvantages, the elimination of which is the concern of the present invention.

For example, in the prior apparatus the elements to be manipulated, during a focusing operation, were not so disposed as to realize the optimum in convenience of adjustment and, frequently, adjustments could not be made without placing the hands in the path of light projection. Additionally, the highest degree of independence of adjustment about the aforesaid axes is not always achieved, in the prior focusing arrangement, since at least certain embodiments of that construction are characterized by the presence of locking instrumentalities which are set, following adjustment of the tube about one axis, and prior to adjustment about the other axis.

With the foregoing in mind, it is a primary object of the persent invention to provide a simple and inexpensive adjustable mounting for cathode-ray tubes—or other devices having a primary image screen—by the use of which mounting such tubes may be readily and precisely oriented with respect to an optical axis in such manner as to accomplish the necessary focus adjustments in the simplest possible manner.

More particularly, the invention has as an object the provision of Schmidt type projection apparatus including a cathode-ray tube enclosed within a dust-resistant housing, in which apparatus the tube screen may be given any three-dimensional angular adjustment, within defined limits, and which apparatus is of such a nature that all adjustments may be accomplished by effecting simple rotary movements of control elements disposed in a single readily accessible location exterior of the housing.

An additional important object of the invention resides in the provision of such focusing apparatus in which the location of the adjusting elements is such that all adjustments can be made without placing the hands within the path of light projection, and in which apparatus the component parts are so shaped and disposed that they introduce no significant light loss.

It is a further feature of the construction that no tools are required during the adjustment operations, and that all adjustments are vernier in nature.

The invention is further characterized in that the stability of the control elements—following adjustment thereof—is such that it is not necessary to employ locking devices which must be released prior to re-manipulation of said elements. As will be appreciated, such locking devices are disadvantageous in that they tend to complicate the adjustment operations, and also in that failure to secure them properly may result in "drift" from the optimum position of adjustment.

In common with the apparatus disclosed and claimed in the said Stephan patent, the device of this invention provides for selective adustment of the tube screen about either of two right-angularly related axes. A third axis, coinciding with the longitudinal axis of the tube, extends generally perpendicular to both the tube screen and the pair of axes aforesaid, and also passes through the geometrical center of the tube screen, or other predetermined point selected in the latter. Axial movement of the tube may be effected along this latter axis. By individually adjusting the tube screen with respect to the above-described axes, it is possible to achieve resultant components of adjustment movement of the screen in all planes, that is, universal or three-dimensional adjustment of the screen is provided.

The manner in which the above-mentioned objects—together with certain advantageous constructional features of the present invention— are realized, may best be understood by making reference to the following description and the accompanying drawings in which there is described and illustrated a preferred embodiment of this invention.

In the drawings:

Figure 1 is a somewhat diagrammatic, perspective representation showing the essential elements of the invention and illustrative of the mode of operation thereof;

Figure 2 is a sectional view taken through the longitudinal-vertical mid-plane of apparatus constructed in accordance with the invention;

Figure 3 is a sectional view taken in the direction indicated by the line 3—3 of Figure 2;

Figure 4 is a sectional view taken through the longitudinal-horizontal mid-plane of the apparatus, that is, taken in the general direction indicated by the line 4—4 applied to Figure 3; and, Figure 5 is a perspective illustration showing a portion of the apparatus on an enlarged scale.

Although the following description and the accompanying drawings are fully illustrative of my improved focusing apparatus, per se, and indicative of the preferred mode of operation, it is to be understood that the apparatus is preferably used in conjunction with projection television equipment of the type completely disclosed in the aforesaid patent to Stephan to which reference may be made in the event that further elucidation of the improved apparatus, in situ, should be desired.

First making detailed reference to Figures 2 to 4, the class of projection system to which the invention is most applicable includes a cathode-ray picture tube 10 having a fluorescent screen or target area 11 in the forward face thereof, the projection tube being adapted for cooperation with a concave mirror and a lens, or plate, configured to correct for an aberration introduced by the mirror. Since the invention may be well understood without reference to the mirror and the correcting lens, per se, these elements are not illustrated in the drawings, but it is to be understood that, in accordance with known practice, the tube 10, the mirror and the correcting plate are arranged as a unitary assembly enclosed in a dust-resistant housing indicated, generally, at 12. When the apparatus is in use, the concave mirror is received within an annular seat or collar portion 13 which is disposed at that end of the housing 12 which confronts the face of the tube 10. As will be recognized, a correcting lens of the type employed herein surrounds the neck portion of the tube and is held against the opposite end of the housing 12 by means of a plurality of adjustable retaining devices two of which are illustrated at 14, in Figures 2 and 4.

Since such a Schmidt system is well known in optics, and since the invention is concerned with the manner in which the tube 10 is adjustably supported within the housing 12, detailed description of the system is not necessary herein. However, if further description of such projection television apparatus is desired, reference may be had to the above-identified patent to Stephan.

In such projection equipment, the cathode-ray tube screen must be properly oriented with respect to the optical axis of the system in order that all portions of the projected image may be focused properly upon a viewing screen (not shown). Also, not infrequently, the viewing screen is angled with respect to the optical axis of the Schmidt system which angularity, if compensation is not made therefor, introduces an out-of-focus effect.

In particular accordance with the present invention, both the general focus requirements, and correction for out-of-focus effects which are introduced if the viewing screen is angled with respect to the optical axis, are taken care of by a novel mounting providing for ready and accurate three-dimentional adjustment of the tube screen with respect to the optical axis, said axis being represented at 15 in the drawings. As will be understood, the aforesaid concave mirror and the correcting lens define the optical axis.

To provide for such focus requirements, and in common with the structure disclosed and claimed in the Stephan patent, supra, the tube 10 is mounted for rotational movements about a pair of axes passing, in substantially right-angularly related directions, through a predetermined point which is preferably in approximate coincidence with the geometrical center of the fluorescent screen of the tube. This point clearly appears in the drawings, and bears the reference character 16, the aforesaid pair of axes being represented at X—X and Y—Y, in which connection see particularly Figure 1. A Z-axis, being the longitudinal axis of the tube, also appears in the drawings, in which connection reference may be made to Figure 1. In other views of the drawings the Z-axis is shown in such position that it coincides with the optical axis 15, however, in practice these two axes will frequently be in only approximate coincidence.

To provide for precisely controlled movements about the three axes aforesaid, and in accordance with the foregoing statements of object and advantage, the tube 10 is carried by a yoke member 17 the free leg portions of which straddle the tube face in the general plane thereof and are mounted upon the housing 12 at spaced points defining the axis identified at X in the drawings. To this end, the housing is provided with a pair of confronting bosses 18—18 (see Figures 3 and 4), through which pass studs 19—19 which effect pivotal securement of the yoke 17 to the housing 10 and provide for pivotal movements of said yoke about the said X-axis.

Carried by a rearwardly extending portion 20 of the yoke 17 is a member or plate 21 which is journalled for swinging movements in a plane generally paralleling the optical axis, through the agency of a stud 22 which is fixedly secured to the yoke 17, any suitable means being used for this purpose. The essential features of this arrangement may be well understood by making particular reference to Figures 1 and 2, in which connection it is to be noted that the swingable plate or member 21 underlies the portion 20 of yoke 17, and that said plate supports the tube 10, as will more fully appear in what follows.

The stud 22 is so disposed upon yoke 17 that it defines the axis Y—Y, which axis passes through the center point 16 of the tube screen and intersects axis X—X, regardless of the angular position of the yoke about the axis X—X. Thus the yoke 17 is mounted for pivotal movements about the axis X—X, whereas the plate 21—which is movable with the yoke during movements of the plate about the X-axis—is further mounted for swinging movements with respect to the yoke, at a point so disposed that the swinging movements of said plate take place about the Y-axis regardless of the position of the yoke.

Now making reference to the manner in which the plate 21 provides support for the tube 10, it will be observed, from Figures 2 and 4, that a clamp 23 surrounds the neck of the tube, and thereby supporting the latter, and that this clamp is provided with an upwardly extending arm 24 which terminates in a plate 25. Plate 25, in turn, is carried by swingable plate 21, in the manner now to be described.

As best seen in Figures 2, 4 and 5, plate 21 is provided with a downwardly turned flange 26 and with a pair of downwardly turned ear portions 27—27. This flange, and the said ear portions, are apertured to receive a pair of guide rods 28—28 which are freely slidable in the apertures and which pass through apertured flanges 29—29 upstanding from the plate 25. Fixedly secured in flange 26, and lying midway between the guide rods 28—28 is a threaded shaft 30 (see particularly Figures 4 and 5). Shaft 30 also passes through flanges 29—29, of plate 25 and through an angle bracket 31 (Figure 4) fixed to the free ends of guide rods 28—28 as by means of nuts 32—32. The nuts 32 cooperate with a shouldered portion formed adjacent the free end of the guide rods in such manner as to secure the tube-supporting plate 25 to the guide rods, which rods, as set forth above, are slidable within the flanges formed upon swingable plate 21. The angle bracket 31 has an offset portion spaced from the confronting face of flange 29, and between this angled portion and the said confronting face lies a screw-threaded control element, or adjusting member 33, which is cooperable with the threads provided upon shaft 30 to provide for reciprocatory movements of the tube-supporting plate 25, and therefore of the guide rods 28—28, with respect to the pivotally mounted plate 21. Such reciprocatory movements, of course, result in similar movements of the tube 10 along the axis Z—Z.

As will now be understood, clockwise rotation of the control element 33 causes said member to bear against the upturned flange 29 and, by virtue of the screw-threaded engagement of element 33 with the threaded rod 30, results in movement of the plate 25, and therefore of the tube 10, in a direction toward swingable plate 21 and along the axis Z—Z. Similarly, counter-clockwise rotation of element 33 causes said element to bear against the inside surface of the recessed portion of angle member 31, and thus results in moving the plate 25 away from the swingable plate 21 and in consequent movement of the tube backwardly along the axis Z—Z. A pair of spring washers 33a and 33b serve to take up any backlash between the threaded portions of shaft 30 and element 33, said washers also being effective to prevent inadvertent rotation of element 33.

Now making more detailed reference to the manner in which the yoke 17, and consequently tube 10, may be adjusted about the axis X—X, it will be seen (Figure 2) that the stud 22 carries a rod 34 which is pivotally secured to said stud, as at 35, and extends backwardly through an apertured extension 36 of the housing 12. The free end of rod 34 is threaded and, through the agency of a control element 37 and an angle bracket 38 (said element and bracket—as well as the spring washers associated therewith—being essentially similar to elements 33 and 31 already described) it is possible to effect precise, micrometric adjustment of the tube 10 about the axis X—X, by effecting swinging movements of the yoke 17 about the studs 19—19 which serve to secure said yoke to the housing 12. During such swinging movements the plate 21 remains fixed with respect to yoke 17 and, therefore, both said plate 21 and the tube 10 are carried with the yoke during the swinging movements aforesaid.

Pivotal movements of the tube 10 about the axis Y—Y are provided for as follows.

As appears to best advantages in Figures 4 and 5, a third adjustable control element 39 extends transversely of the swingable plate 21, said element 39 being secured to a screw-threaded rod 40 journalled for rotary movements in a pair of flanges 41—41, which latter extend downwardly from the extension 20 of yoke 17. Again, spring washers 39a and 39b are used in the manner and for the purposes already stated with respect to washers 33a and 33b.

As clearly shown in Figure 5, the rod 40 passes through a block 42, being in screw-threaded engagement therewith, and overlying said block 42 is a swingable link 43 pivotally secured to the plate 21 by means of a stud shown at 44. Block 42 carries an upwardly extending key 45 which is engaged in an aperture provided in swingable link 43. Rotary movements imparted to the control element 39 serve to rotate rod 40 and thus cause reciprocation of the block 42 along said rod 40. The reciprocatory movements of the block 42 are imparted to the plate 21, through the swingable link 43, thus causing the link to be moved about the stud 22 carried by yoke 17. The movements of block 42 are translational, whereas the movements of plate 21 are rotational, but free transfer of motion between said block and plate is accomplished through the agency of the aforesaid swingable link 43.

Thus, when it is desired to adjust the tube screen about the axis Y—Y, precise, micrometric adjustment movements are imparted to the swingable plate 21, which plate serves to support tube 10 in the manner described above.

To provide support for the swingable plate 21, in addition to the support afforded by the interconnection of said plate with the stud 22, the plate has an elongate aperture 46 through which passes a screw member 47 (Figure 4) which serves to support a washer 48. The said washer bears against the under surface of the plate 21, whereas the screw-threaded member 47 extends through the lost motion connection means afforded by slot 46 and is engaged in extension 20 of yoke 17.

It is particularly to be observed that the apparatus of the invention is not only of such a character as to insure ready and precise positioning of the tube screen about either of two right-angularly related axes—as well as along the axis of the tube—but also that the control elements 33, 37 and 39 all extend exteriorly of the housing 12 and are juxtaposed in generally the same readily accessible location. As shown in Figure 3, a cover member 49 is preferably secured to the housing 12, as at 50, serving to minimize the effects of dust and moisture which might otherwise gain entrance to the housing 12 through the aperture provided in the upper portion thereof. All adjustments of the tube may be made without interfering with the path of light projection, and it is to be noted that the component parts of the apparatus are so shaped and disposed that they introduce no significant light loss.

With the foregoing detailed description in mind, the diagrammatic showings of Figure 1 will illustrate the simplicity and accuracy with which the tube may be focused. Rotation of the control element 37, and consequent pivotation of yoke 17, is effected until the upper and lower portions of the image appear in proper focus upon the viewing screen (not shown). When this conditions has been reached, manipulation of the control element 39 serves to swing the plate 21, and therefore to move the tube 10, about the axis Y—Y until a position is reached in which the side portions of the primary image are also projected into good focus upon the viewing screen. All of the focusing adjustments may be made without the necessity of gaining access to the housing and, since the tube is moved selectively about individually defined axes, the apparatus is extremely stable during the focusing adjustments.

Manipulation of the control element 33, and consequent adjustment of the tube along the axis Z—Z, may be used to insure that pivotal movements of the tube about either the X-axis or the Y-axis will, in fact, take place about the said predetermined point lying in the tube screen. Following adjustment of the tube about the X and Y axes, it may at times be advantageous to recheck for most accurate focus, by trimming the tube slightly along the Z-axis.

I claim:

1. For television apparatus and the like including a primary image screen, mechanism for angularly adjusting said screen about a predetermined point as a center of pivotation whereby properly to orient said screen with respect to an optical axis, said point lying approximately in said screen, said mechanism including: means providing for selective rotational adjustment of said screen about either of a pair of individual axes passing through said point in substantially right-angularly related directions and lying substantially in a common plane, said last-mentioned means comprising; structure mounted for pivotal movements about one of said axes, a member carried by said pivotally mounted structure and movable therewith, said member also having freedom for pivotal movements about the other of said axes and independently of said structure, support means carried by said member and providing support for the aforesaid screen, and a pair of control elements one of which is drivingly associated with said structure and the other of which is drivingly associated with said member, said control elements being selectively operable to effect micrometric adjustment of said structure and said member about the associated axes.

2. For television apparatus and the like including a primary image screen, mechanism for angularly adjusting said screen about a predetermined point as a center of pivotation whereby properly to orient said screen with respect to an optical axis, said point lying approximately in said screen, said mechanism including: means providing for selective rotational adjustment of said screen about either of a pair of individual axes passing through said point in substantially right-angularly related directions, said last-mentioned means comprising; structure mounted for pivotal movements about one of said axes, a member carried by said pivotally mounted structure and movable therewith, said member also having freedom for pivotal movements about the other of said axes and independently of said structure, support means carried by said member and providing support for the aforesaid screen, and a pair of control elements one of which is drivingly associated with said structure and the other of which is carried by said structure and drivingly associated with said member, said control elements being selectively operable to effect micrometric adjustment of said structure and said member about the associated axes.

3. For television apparatus and the like including a primary image screen, mechanism for angularly adjusting said screen about a predetermined point as a center of pivotation whereby properly to orient said screen with respect to an optical axis, said point lying approximately in said screen, said mechanism including: means providing for selective rotational adjustment of said screen about either of a pair of individual axes passing through said point in substantially right-angularly related directions and lying substantially in a common plane, said last-mentioned means comprising; structure mounted for pivotal movements about one of said axes, a member carried by said pivotally mounted structure and movable therewith, said member also having freedom for pivotal movements about the other of said axes and independently of said structure, support means carried by said member and providing support for the aforesaid screen, a pair of control elements one of which is drivingly associated with said structure and the other of which is drivingly associated with said member, said control elements being selectively operable to effect micrometric adjustment of said structure and said member about the associated axes; and means for moving said support means translationally with respect to said member whereby to effect movements of said screen in a direction generally normal to said plane.

4. Apparatus in accordance with claim 1, and further characterized in that said structure includes mounting means aligned with one of said axes, and said member comprises a plate mounted for swinging movements about said mounting means.

5. Apparatus in accordance with claim 4, and further including means providing for micrometric adjustment of said screen with respect to said plate in a direction generally normal to said plane.

6. Apparatus in accordance with claim 1, and further characterized in that said structure comprises a generally U-shaped frame the ends of which are mounted for pivotation about spaced points defining the associated axis.

7. For television apparatus and the like including a cathode-ray tube having a primary image screen, mechanism for angularly adjusting said tube about a predetermined point as a center of pivotation whereby properly to orient said screen with respect to an optical axis, said point lying approximately in said screen, said mechanism including: means providing for selective adjustment of said screen about either of a pair of individual rotational axes passing through said point in substantially right-angularly related directions and lying substantially in a common plane, said last-mentioned means comprising; a yoke having leg portions which straddle the face of said tube in the general plane thereof and are so mounted as to provide for pivotal movements of said yoke about one of said axes, a member carried by said yoke and movable therewith during movements of the yoke about the said axis, said member also having freedom for pivotal movements about the other of said axes and independently of said yoke, said member further providing support for said tube, and a pair of manually operable control elements one of which is adapted to react against fixed structure and is drivingly associated with said yoke and the other of which is adapted to react against said yoke and is drivingly associated with said member, said control elements being selectively operable to effect micrometric adjustment of said yoke and said member about the associated axes.

8. Apparatus in accordance with claim 7, and further including a third control element for effecting micrometric movement of said tube with respect to said plate-like member in a direction such as to effect movements of the tube screen in a direction generally normal to said plane.

9. For television apparatus and the like including a cathode-ray tube having an image screen, a housing, mechanism adapted to support said tube within said housing with freedom for angular movements about a pair of axes passing through the mid-point of the screen in substantially right-angularly related directions and in the plane of the screen, said mechanism comprising: a yoke pivotally mounted upon said housing and so disposed that the pivotal movements thereof take place about one of said axes; means carried by said yoke and adapted for connection with said tube to support the same, said means being movable with the said yoke during movements of the yoke about the said one axis, said means further being so pivotally secured to said yoke as to provide freedom for pivotal movements of said means about the other of said axes and independently of said yoke; and a pair of control elements one of which is drivingly associated with said yoke and the other of which is carried by said yoke and is drivingly associated with the said means, said control elements being selectively operable to effect micrometric adjustment of said yoke and said means about the associated axes.

10. For television apparatus and the like including a cathode-ray tube having an image screen, fixed structure including a housing, mechanism adapted for connection with said tube to support the same within said housing with freedom for angular movements about a pair of axes passing through the mid-point of the screen in substantially right-angularly related directions and in the plane of the screen, said mechanism comprising; a yoke having leg portions which straddle the face of said tube in the general plane thereof and are mounted upon said housing at spaced points defining one of said axes, whereby to provide for pivotal movements of the yoke about the said one axis; means carried by said yoke and adapted for connection with said tube to support the same, said means being movable with said yoke during the movements of the yoke about the said one axis, said means further being mounted for swinging movements with respect to the yoke at a point so disposed that the swinging movements of said means take place about the other of said axes regardless of the position of the yoke; and a pair of manually operable control elements one of which is adapted to react against said fixed structure and is drivingly associated with said yoke and the other of which is adapted to react against said yoke and is drivingly associated with said means, said control elements being selectively operable to effect micrometric adjustment of said yoke and said means about the said axes.

FREDERICK E. RADMAN.

REFERENCES CITED

The following references are of record in the file of this patent:

UNITED STATES PATENTS

| Number | Name | Date |
|---|---|---|
| 2,047,020 | Flaherty | July 7, 1936 |
| 2,162,908 | Bedford | June 20, 1939 |
| 2,285,509 | Goshan | June 9, 1942 |
| 2,424,513 | Stephan | July 22, 1947 |
| 2,451,832 | Keim | Oct. 19, 1948 |
| 2,455,476 | Epstein | Dec. 7, 1948 |
| 2,457,113 | Alden | Dec. 28, 1948 |
| 2,467,185 | Cady | Apr. 12, 1949 |
| 2,499,579 | Fritsch | Mar. 7, 1950 |